Patented Dec. 21, 1937

2,102,831

UNITED STATES PATENT OFFICE 2,102,831

FERTILIZER MANUFACTURE

John L. Brill, Newark, Del., assignor to E. I. du Pont de Nemours & Company, Wilmington, Del., a corporation of Delaware No Drawing. Application April 16, 1937, Serial No. 137,209

14 Claims. (Cl. 71—27)

This invention relates to fertilizers and more particularly to nitrogenous phosphatic fertilizers and methods of production thereof, as disclosed in my copending application Serial No. 15,399.

It is known that phosphate rock may be decomposed by various mineral acids to give valuable fertilizer materials, generally referred to as superphosphates. It is also known to add various nitrogen-containing materials to such superphosphates in processes of preparing complete or finished fertilizers.

The practice has become established in the fertilizer industry of adding inorganic nitrogen to superphosphate by treating the same with free or uncombined ammonia that will react with the acidic components of the superphosphate. Anhydrous ammonia, aqua ammonia and nitrogen-containing liquids such as ammoniacal ammonium nitrate and carbonate-containing solutions have been used in treating ordinary superphosphate, double superphosphate, and the like, and as a source of inorganic nitrogen in fertilizers containing superphosphate or double superphosphate as one constituent.

It has been found that the addition of inorganic nitrogen to superphosphate by treating with free or uncombined ammonia such as anhydrous and aqua ammonia is practically and economically desirable, but it has the disadvantage that there is a fairly definite upper limit beyond which the superphosphate will not absorb further ammonia without reduction in its commercial value. That is, it will not absorb further ammonia without partial reversion of the citrate soluble to citrate insoluble phosphoric acid with consequent loss in commercial value of the phosphoric acid.

The addition of fixed ammonia, as well as free or uncombined ammonia, in the form of a liquid or solution is equally desirable. This has been accomplished to a limited degree by the addition of urea, sodium nitrate, ammonium nitrate, and the like to ammoniating solutions. The content of fixed ammonia in ammoniating solutions has been limited, however, by the solubility of the solute at the relatively low temperatures frequently encountered in commercial practice, by the desirability of maintaining a relatively high ammonia content, and by the limitations on the quantity of water that may be used as a solvent and still produce fertilizers of satisfactory physical properties.

It is the object of this invention to provide a means for the preparation of improved ammoniating solutions covering a very wide range of free to fixed ammonia in which, as desired, the fixed ammonia may be organic or a combination of organic and inorganic materials. A second objective of the invention is to provide a method for the manufacture of improved fertilizers.

Other objects and advantages of the invention will be apparent by reference to the following specification in which its preferred details and embodiments are described.

According to the present invention highly desirable nitrifying solutions or liquors may be prepared by the use of formamide as one component and improved nitrogen-containing fertilizers may be prepared by the use of formamide alone or formamide-containing nitrifying solutions.

Formamide is a liquid at normal temperatures, (i. e. down to +3° C.) is practically non-volatile, contains 31% nitrogen, is miscible with water and ammonia, is a good source of nitrogen for plant growth, and is a good solvent for nitrogenous compounds. It, therefore, possesses the outstanding qualifications for a desirable nitrogen-carrying or nitrifying agent and is especially useful as a constituent of ammoniating solutions or liquors.

I have found that by the use of formamide as the solvent, nitrifying liquors can be obtained in which the ratio of fixed to free ammonia may be varied over a wide range and at the same time the use of water, which has heretofore been believed necessary, may be appreciably lowered if not entirely eliminated. The deleterious effects of quantities of water are in large part due to the fact that it remains in the fertilizer as such and, containing no nitrogen or other element available to the plants for growth, dilutes the fertilizer and exerts no beneficial effects. Formamide, on the other hand, in addition to containing a total of 31% nitrogen, as against its complete absence in water, undergoes a chemical change in the finished product whereby excess water present in the fertilizer is absorbed and a solid, ammonium formate, is formed. This material, like formamide, furnishes an easily soluble form of nitrogen which is readily available to the plants.

The deleterious effects of quantities of water can thus be largely, if not wholly, overcome, according to this invention, while the total nitrogen content may be kept high, and the crystallization temperature low enough for commercial purposes. Furthermore, by using formamide rather than water, in nitrifying liquids, the nitrogen (ammonia) content of the liquid is automatically increased by a considerable amount inasmuch as formamide contains 31% nitrogen as against the total absence of nitrogen in water. This feature is, of course, one of the important advantages of the present invention.

This invention may be practiced by addition of formamide to the usual fertilizer materials such as superphosphate, double and triple superphosphate, potash salts, organic materials, such as tankage, cottonseed meal, castor pomace, and the like, in various ways.

The formamide may be added alone (as fixed ammonia containing material), or before, during, or after addition of other materials in preparing a fertilizer. Thus, when it is desired to add fixed ammonia as a liquor to a fertilizer material, formamide may be used alone or it may be added to or substituted for ingredients of other ammoniating solutions generally, such, for example, as the ammoniating or nitrifying solutions described in U. S. Patent 1,894,136, which contain both inorganic and organic ammonia. Again, proceeding according to this invention, formamide may be added to a phosphatic material, either before, after, or during addition of other materials, for example, potash salts, such as potassium sulfate, chloride, and nitrate; ammonium salts such as ammonium chloride, nitrate, sulfate, carbamate, mono- and di-ammonium phosphates, or the like; and then the product obtained may be further ammoniated by use of commercial aqua or anhydrous ammonia. Or, alternately, the phosphatic material may be first ammoniated, somewhat at least by use of ammonia as above described, and thereafter formamide added to the ammoniated product; or the formamide may be added during such ammoniation with ammonia or like nitrogen-containing material while, at the same time, after or before, other materials such as above described may be added as are desired to obtain a finished fertilizer.

For best results in the case of liquid compositions containing one or more normally solid compounds, I have found that it is preferable, altho not necessary, to utilize at least about 5% formamide in the nitrifying liquor in order to obtain the benefit of its desirable solubilizing properties. No upper limit exists, however, inasmuch as formamide alone may be used as nitrogen-carrying liquid, if desired.

I have found, for example, that a desirable finished fertilizer may be obtained by first preparing a liquor containing various proportions of formamide, ammonia and water. This liquor may be sprayed upon or otherwise mixed with phosphatic materials and the resulting product thereafter mixed with additional fertilizer materials, such as potash salts, and the like and/or other materials as those previously described. The proportions of liquor to superphosphate or other phosphatic materials may vary, dependent upon the nitrogen content which it is desired to have in the final product.

Similarly I have found that a desirable liquor for use in nitrogen incorporation and which contain inorganic and organic nitrogen may be obtained by mixing formamide, ammonia, water and a water soluble fertilizing salt, such as ammonium nitrate. When this nitrogen-containing liquor is incorporated into a phosphatic material as above described a highly desirable fertilizer results which may, if desired, be further mixed with other materials to produce a complete fertilizer.

I have found, as previously indicated, that formamide may be advantageously incorporated into nitrogen-containing or ammoniating liquors generally. For example, formamide may be used in ammoniating solutions or nitrogen-containing solutions which have incorporated therein a wide variety of nitrogenous compounds including nitrates, such as sodium and calcium nitrate; ammonium salts of inorganic acids, such as ammonium chloride, ammonium nitrate and ammonium sulfate; ammonium salts of organic acids, such as ammonium formate and acetate; and organic nitrogenous materials such as urea, acetamide, amines, and amino acids. Likewise it may be used as a solubilizing agent, or solvent, for water soluble fertilizing salts such as above described and, in addition, as a solubilizing agent for any other water soluble fertilizing salts such as potassium chloride, potassium sulfate, and the like. In these solutions formamide will generally be used in conjunction with water and/or free or combined ammonia as solvents or solubilizing agents although, as is apparent, the formamide is in general a substitute for at least a part of the water ordinarily employed in ammoniating or nitrifying liquids.

Its use, however, is not restricted to such combinations, for it may be used alone or in combination with one or more solvents such as water, uncombined ammonia, and other nitrogenous materials. In the solutions thus prepared the ratio of fixed to free or uncombined ammonia can readily be varied over an extremely wide range, for example from 1 part of fixed ammonia and 99 parts of free or uncombined ammonia to 99 parts of fixed ammonia per part of free or uncombined ammonia. The proportion of fixed ammonia derived from inorganic and organic sources can also be varied over a wide range. The variations can be attained without the addition of high percentages of water, such as are generally objectionable in ammoniating solutions, without lowering the total ammonia content unduly and without having crystallization temperatures so high that commercial use is not practicable.

In utilizing solutions containing formamide, together with ammonia, urea or ammonium nitrate or two or more of these or like materials which are classed as sources of inorganic or organic ammonia, it will be apparent that many advantages are present. Containing, as such solutions do, uncombined ammonia, fixed organic ammonia and fixed inorganic ammonia in a highly concentrated form, they permit the introduction in a single operation and in liquid form, of several forms of ammonia into a fertilizer base; and since the relative proportions of formamide, urea, or other fixed ammonia compounds and ammonia may be easily varied, a great flexibility of operation is at the hand of the operator. Thus, for example, by varying the composition of the ammoniating solution, from 1 to more than 10% nitrogen can be added to a commercial grade of superphosphate in one operation.

Fertilizers may be produced according to this invention by mixing nitrogen-containing or ammoniating liquid with suitable proportions of superphosphate or mixed fertilizers containing phosphatic materials in a mixing drum, the liquid being sprayed thereupon if desired, and the proportions thereof to superphosphate being dependent upon the desired chemical composition of the final product. Compared with processes involving the separate addition of the same ingredients, a lower temperature on ammoniation and lower hygroscopicity of the product result.

Although the proportions of formamide, ammonia, water and fertilizing salts may be varied without departing from this invention, I prefer to prepare nitrifying liquids which contain at least about 5 parts by weight formamide, as previously indicated, at least about 10 parts ammonia, at least about 5 parts water and at least about 35 parts of a water soluble salt having fertilizing value selected from the group consisting of alkali metal, alkaline earth metal and ammonium salts such as ammonium nitrate, sodium nitrate, calcium nitrate, potassium nitrate, potassium chloride, or the like. More specifically, I have found that a nitrifying liquid of improved characteristics may be obtained by mixing about 5–25 parts by weight of formamide, 10–25 parts ammonia, 5–20 parts water, and 35–65 parts of a water soluble salt having fertilizing value such as above described.

The following examples, altho not limiting, indicate how the invention may be practiced. (Parts given are by weight.)

*Example 1.*—With 2000 lbs. of commercial superphosphate (17% $P_2O_5$), in a conventional mixing drum, there were slowly mixed 200 lbs. of formamide. There resulted a fertilizer base of satisfactory physical appearance containing 2.8% nitrogen and 15.5% $P_2O_5$. Altho the formamide was added to the superphosphate in the form of a spray, it could easily be added in thin streams or other manner resulting in intimate mixture.

*Example 2.*—To 1040 lbs. of the product obtained as described in Example 1 there were added, in a mixing drum, 200 lbs. of tankage, 56 lbs. of ammonium sulfate, 160 lbs. of potassium chloride, 514 lbs. of filler (sand). This complete mixture was further ammoniated by the addition thereto of 30 lbs. of anhydrous ammonia.

A satisfactory complete fertilizer was obtained. Altho the ammonia was added during mixture of the other listed ingredients it could have been added to the material of Example 1 before addition of the other ingredients, or thereafter.

*Example 3.*—Similarly to the procedure of Example 1, with 2000 lbs. of commercial superphosphate there were mixed 215 lbs. of a liquid containing 40 parts ammonia, 40 parts formamide, and 20 parts water. The result was a fertilizer base of desirable characteristics, containing 4.4% nitrogen and 15.3 $P_2O_5$.

*Example 4.*—To 1050 lbs. of the product obtained as described in Example 3 there were added in a mixing drum, 200 lbs. of tankage, 92 lbs. of ammonium sulfate, 160 lbs. of muriate of potash and 498 lbs. of filler; I utilize sand as the filler but in some instances prefer to utilize dolomite or other liming materials, particularly when a neutral fertilizer is desired. The product obtained as above described was found to be of desirable physical character.

*Example 5.*—To 2000 lbs. of commercial superphosphate there were added, in a convenient mixing drum, 325 lbs. of an ammoniating liquor containing 35 parts urea, 15 parts formamide, 26 parts ammonia, and 24 parts water.

A desirable fertilizer base was obtained containing 5.9% nitrogen and 14.6% $P_2O_5$.

*Example 6.*—To 1100 lbs. of fertilizer base obtained as described in Example 5, there were added, in a mixing drum, 205 lbs. of tankage, 160 lbs. of muriate of potash and 535 lbs. of filler (sand). A very desirable complete fertilizer was obtained.

Altho this fertilizer was obtained as above described it will be understood that the sequence and manner of mixture of ingredients may be varied. Thus, for example, the liquor of Example 5 may be added to the superphosphate simultaneously with the ingredients of the present example, or thereafter, as well as before.

Likewise dolomite or other fillers may be, equally if not preferably, utilized rather than sand.

*Example 7.*—To 946 lbs. of commercial superphosphate 205 lbs. tankage, 160 lbs. muriate of potash, and 535 lbs. of sand there were added 154 lbs. of the liquor described in Example 5. As described in Example 6, variations can likewise be made in sequence and manner of mixture of ingredients without departing from this invention.

*Example 8.*—Following the method described in previous examples, to 2000 lbs. of commercial superphosphate were added 328 pounds of a liquor containing 50 parts ammonium nitrate, 15 parts formamide, 25 parts ammonia and 10 parts water. A desirable fertilizer base was obtained. Sodium or calcium nitrate may be substituted for at least a part of, if not all of, the ammonium nitrate if desired.

*Example 9.*—To 1100 pounds of the product obtained in Example 8 there were added, in a mixing drum, 190 pounds of tankage, 160 pounds of muriate of potash and 550 pounds of filler (sand) to give a desirable complete fertilizer.

*Example 10.*—Similarly to the ammoniating or nitrogen-carrying liquors described in previous examples, other liquid compositions may likewise be added in varying ratios to phosphatic materials to give fertilizer bases or complete fertilizers when simultaneously or subsequently or previously mixed with other fertilizer ingredients. Illustrative of the many compositions one or more of which may be used in this manner according to this invention are the following:

| Substances | Parts by weight |
|---|---|
| Formamide | 30 |
| Ammonia | 70 |

| | |
|---|---|
| Formamide | 25 |
| Urea | 50 |
| Ammonia | 25 |

| | |
|---|---|
| Formamide | 70 |
| Ammonia | 30 |

| | |
|---|---|
| Ammonia | 20 |
| Ammonium nitrate | 60 |
| Formamide | 20 |

| | |
|---|---|
| Formamide | 50 |
| Ammonia | 50 |
| Potassium nitrate | 10 |

| | |
|---|---|
| Formamide | 30 |
| Urea | 35 |
| Ammonia | 20 |
| Water | 15 |

| | |
|---|---|
| Formamide | 15 |
| Ammonium nitrate | 51 |
| Ammonia | 17 |
| $H_2O$ | 17 |

| | |
|---|---|
| Formamide | 60 |
| Sodium nitrate | 40 |

| | |
|---|---|
| Formamide | 40 |
| Ammonia | 20 |
| Water | 10 |
| Sodium nitrate or calcium nitrate | 30 |

| | |
|---|---|
| Formamide | 60 |
| Calcium nitrate | 40 |

| | |
|---|---|
| Formamide | 15 |
| Ammonium nitrate | 50 |
| Ammonia | 20 |
| Water | 15 |

| | |
|---|---|
| Formamide | 20 |
| Ammonium formate | 15 |
| Urea | 25 |
| Ammonium nitrate | 10 |
| Ammonia | 20 |
| Water | 10 |

In the case of these and similar compositions it will be understood that various proportions of the compositions to superphosphate or phosphatic materials may be utilized such as, say from 50–400 lbs. of liquor composition per 2000 lbs. of superphosphate.

Various changes may be made in the methods and details of this invention without departing therefrom or sacrificing any of the advantages thereof.

I claim:

1. A fertilizer nitrifying liquid containing formamide, ammonia, a relatively small quantity of water, and a water soluble salt having fertilizing value selected from the group consisting of alkali metal, alkaline earth metal, and ammonium salts.

2. A fertilizer nitrifying liquid containing formamide, ammonia, a relatively small quantity of water, and ammonium nitrate.

3. A fertilizer nitrifying liquid containing formamide, ammonia, a relatively small quantity of water, and calcium nitrate.

4. A fertilizer nitrifying liquid containing formamide, ammonia, a relatively small quantity of water, and sodium nitrate.

5. A fertilizer nitrifying liquid containing about 5–25 parts by weight of formamide, about 10–25 parts of ammonia, about 5–20 parts of water, and about 35–65 parts of a salt having fertilizing value selected from the group consisting of alkali metal, alkaline earth metal, and ammonium salts.

6. A fertilizer nitrifying liquid containing about 5–25 parts by weight of formamide, about 10–25 parts of ammonia, about 5–20 parts of water, and about 35–65 parts of ammonium nitrate.

7. A fertilizer nitrifying liquid containing about 5–25 parts by weight of formamide, about 10–25 parts of ammonia, about 5–20 parts of water, and about 35–65 parts of sodium nitrate.

8. A fertilizer nitrifying liquid containing about 15 parts by weight of formamide, about 20 parts of ammonia, about 15 parts of water, and about 50 parts of a water soluble salt having fertilizing value selected from the group consisting of alkali metal, alkaline earth metal, and ammonium salts.

9. A fertilizer nitrifying liquid containing about 15 parts by weight of formamide, about 20 parts of ammonia, about 15 parts of water, and about 50 parts of sodium nitrate.

10. A fertilizer nitrifying liquid containing about 15 parts by weight of formamide, about 20 parts of ammonia, about 15 parts of water, and about 50 parts of ammonium nitrate.

11. A method of producing a fertilizer which comprises adding to acidic fertilizer materials a liquid containing formamide, ammonia, a relatively small quantity of water, and a water soluble salt having fertilizing value selected from the group consisting of alkali metal, alkaline earth metal, and ammonium salts.

12. A method of producing a fertilizer which comprises adding to acidic fertilizer materials a liquid containing formamide, ammonia, a relatively small quantity of water, and ammonium nitrate.

13. A method of producing a fertilizer which comprises adding to acidic fertilizer materials a liquid containing formamide, ammonia, a relatively small quantity of water, and calcium nitrate.

14. A method of producing a fertilizer which comprises adding to acidic fertilizer materials a liquid containing formamide, ammonia, a relatively small quanity of water, and sodium nitrate.

JOHN L. BRILL.